United States Patent
Choi et al.

(10) Patent No.: US 7,263,705 B2
(45) Date of Patent: Aug. 28, 2007

(54) DISC DRIVE CARTRIDGE AND DISC DRIVE APPARATUS TO PREVENT SCRATCHING OF A DISC WHEN THE DISC IS LOADED INTO A DISC DRIVE

(75) Inventors: Han-kook Choi, Suwon-si (KR); Dae-Kyong Park, Seongnam-si (KR); Dong-seob Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 10/765,277

(22) Filed: Jan. 28, 2004

(65) Prior Publication Data

US 2005/0015793 A1    Jan. 20, 2005

(30) Foreign Application Priority Data

Jul. 19, 2003    (KR) ...................... 10-2003-0049546

(51) Int. Cl.
*G11B 23/03* (2006.01)
(52) U.S. Cl. ...................................................... 720/725
(58) Field of Classification Search ................ 720/728, 720/725
See application file for complete search history.

(56) References Cited

U.S. PATENT DOCUMENTS

| 4,617,655 | A | 10/1986 | Aldenhoven | ................ 720/720 |
|---|---|---|---|---|
| 4,849,958 | A * | 7/1989 | Douwes et al. | ............. 720/633 |
| 6,948,180 | B2 * | 9/2005 | Hayashi | ...................... 720/728 |
| 7,103,899 | B2 * | 9/2006 | Hayashi | ...................... 720/728 |
| 2004/0013082 | A1 * | 1/2004 | Hayashi | ...................... 369/291 |
| 2004/0103425 | A1 * | 5/2004 | Nagasato | .................... 720/728 |
| 2005/0097591 | A1 * | 5/2005 | Choi et al. | .................. 720/728 |

FOREIGN PATENT DOCUMENTS

| EP | 0 915 463 A1 | 5/1999 |
|---|---|---|
| JP | 10-144031 | 5/1998 |
| JP | 2001-6210 | 1/2001 |

* cited by examiner

*Primary Examiner*—David Davis
(74) *Attorney, Agent, or Firm*—Stein, McEwen & Bui, LLP

(57) ABSTRACT

A disc cartridge and a disc drive apparatus. The disc cartridge includes an upper case and a lower case which form an internal space to accommodate a disc, and a pair of elastic protrusions formed at both sidewalls of the lower cases, which are elastically biased toward the internal space so that ends of the elastic protrusions support the disc. Surfaces are formed at the ends to slope toward the internal space so that the disc is located in an upper portion of the internal space and the pair of elastic protrusions supports the disc. The disc descends on the surfaces when the pair of elastic protrusions are opened and the disc is then located in a lower portion of the internal space.

3 Claims, 6 Drawing Sheets

US 7,263,705 B2

DISC DRIVE CARTRIDGE AND DISC DRIVE APPARATUS TO PREVENT SCRATCHING OF A DISC WHEN THE DISC IS LOADED INTO A DISC DRIVE

CROSS-REFERENCE TO RELATED APPLICATIONS

This application claims the benefit of Korean Patent Application No. 2003-49546 filed on Jul. 19, 2003 in the Korean Intellectual Property Office, the disclosure of which is incorporated herein by reference.

BACKGROUND OF THE INVENTION

1. Field of the Invention

The present invention relates to a disc cartridge accommodating a disc and a disc drive apparatus into which the disc cartridge is loaded, and more particularly, to a slot-in disc cartridge and a disc drive apparatus.

2. Description of the Related Art

As shown in FIG. 1, slot-in refers to a way in which a disc cartridge 20 directly goes into and out of a disc drive 10 via a slot 11. As shown in FIG. 2, the disc cartridge 20 inserted into the disc drive 10 via the slot 11 goes to a position where a clamp 21 of a disc 22 is located above a motor hub 12. A shutter 20a, which covers an opening hole 20b, is opened by an opening and closing unit during the incoming of the disc cartridge 20. A magnet 13 installed in the motor hub 12 pulls the disc clamp 21 with a magnetic force, and thus a centering boss 12b is clamped into a cavity 21a of the disc clamp 21 so that the disc 22 rotates with the movement of the motor hub 12. A motor shaft 14 rotates the motor hub 12. Japanese Patent Publication No. 2001-6210 discloses a structure similar to the above-described structure.

In slim disc drive apparatuses, a space of the disc drives into which a disc cartridge is inserted has been reduced. Thus, a gap between the disc cartridge 20 and the motor hub 20 hardly exists. Therefore, when the disc cartridge 20 is inserted into the disc drive 10, the shutter 20a is opened. As a result, the disc 22 contacts with the motor hub 12 and is scratched by the motor hub 12.

Accordingly, a slim disc drive apparatus requires a new structure so as not to damage a disc inserted therein.

SUMMARY OF THE INVENTION

Accordingly, it is an aspect of the present invention to provide a disc cartridge with an improved structure so that a disc is not damaged when the disc is inserted into a slim disc drive apparatus, and a disc drive apparatus.

Accordingly, it is aspects and/or advantages of the invention will be set forth in part in the description which follows and, in part, will be obvious from the description, or may be learned by practice of the invention.

The foregoing and/or other aspects of the present invention are achieved by providing a disc cartridge comprising an upper case and a lower case and a pair of elastic protrusions. The upper and lower cases form an internal space therebetween to accommodate a disc. The pair of elastic protrusions are formed at sidewalls of the lower case and are elastically biased toward the internal space so that ends of the elastic protrusions support the disc. Surfaces are formed at the ends of the elastic protrusions to slope toward the internal space so that the disc is located in an upper portion of the internal space and supported by the pair of elastic protrusions and descends on the surfaces when the pair of elastic protrusions are opened and the disc is then located in a lower portion of the internal space.

It is another aspect of the present invention, to provide a disc drive apparatus loading a disc cartridge having an upper case and a lower case, wherein the lower case comprising at least a pair of elastic protrusions extending from sidewalls of the lower case to support a disc on sloped surfaces formed at ends of the elastic protrusions. The disc drive apparatus comprising levers which contact with the ends of the elastic protrusions to open the elastic protrusions when the disc cartridge enters the disc drive apparatus, to allow the disc to descend on the sloped surfaces in an internal space between the upper and lower cases.

BRIEF DESCRIPTION OF THE DRAWINGS

These and/or other aspects and advantages of the invention will become apparent and more readily appreciated from the following description of the embodiments the accompanying drawings in which.

DETAILED DESCRIPTION OF THE PREFERRED EMBODIMENTS

Figure 1:
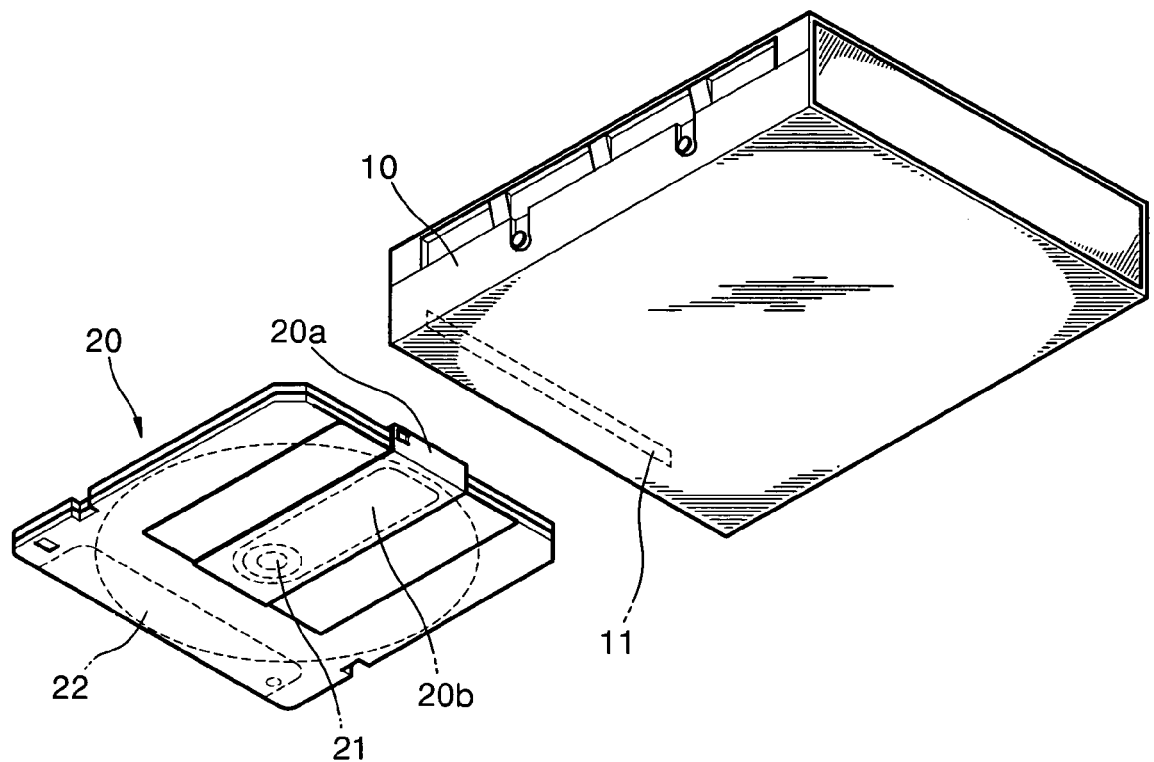
FIGS. 1 and 2 illustrate a case which is opened and closed when a disc cartridge is inserted into a disc drive apparatus, according to the related art.
Figure 2:
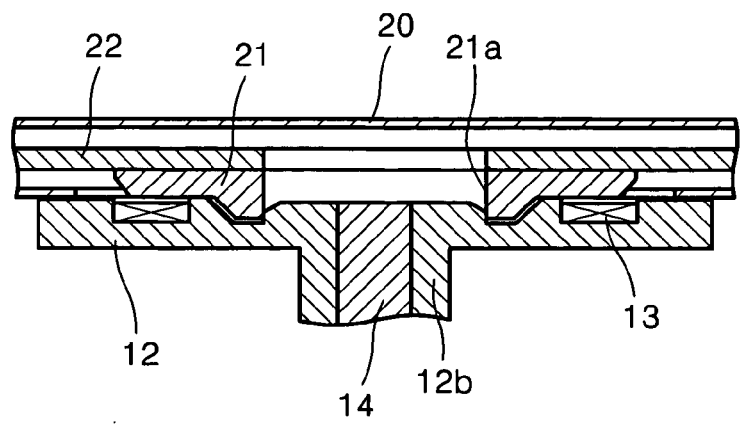

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
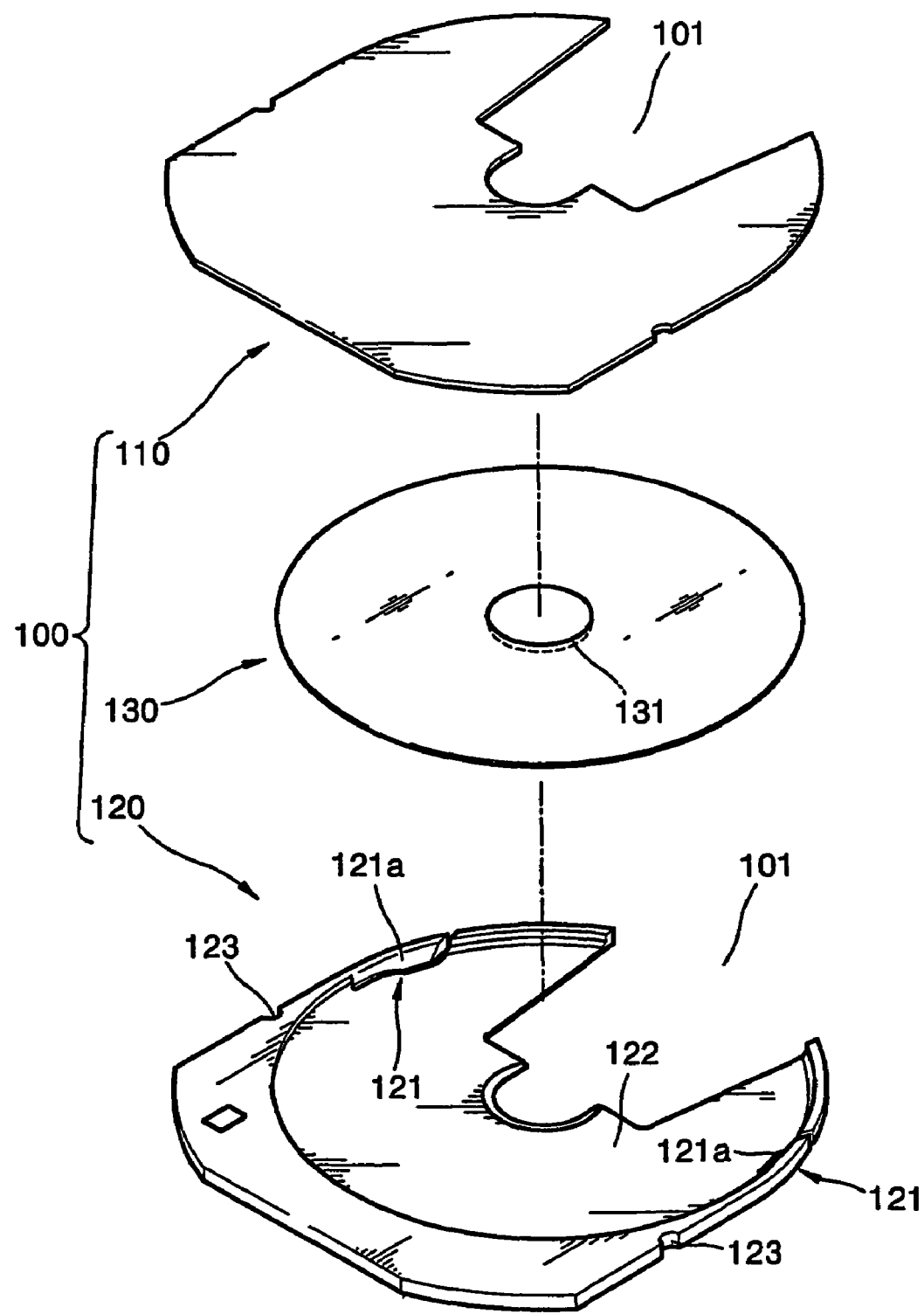
FIG. 3 is an exploded perspective view of a disc cartridge according to the present invention.
Figure 4A:
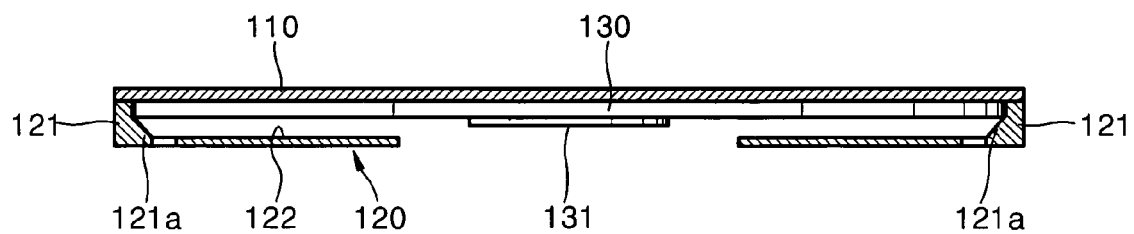
FIGS. 4A and 4B are cross-sectional views illustrating ascending and descending states of a disc in the disc cartridge shown in FIG. 3.
Figure 4B:
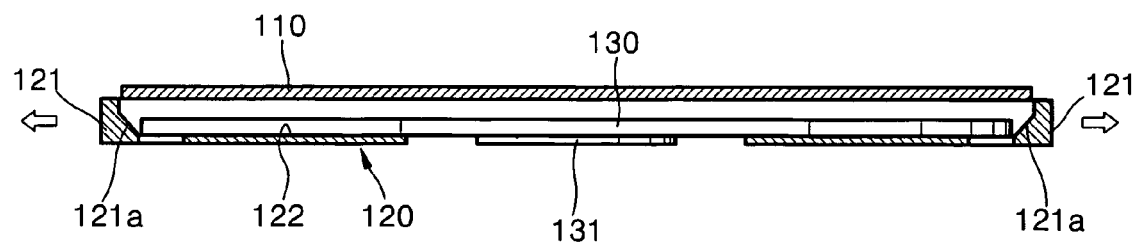
Figure 5:
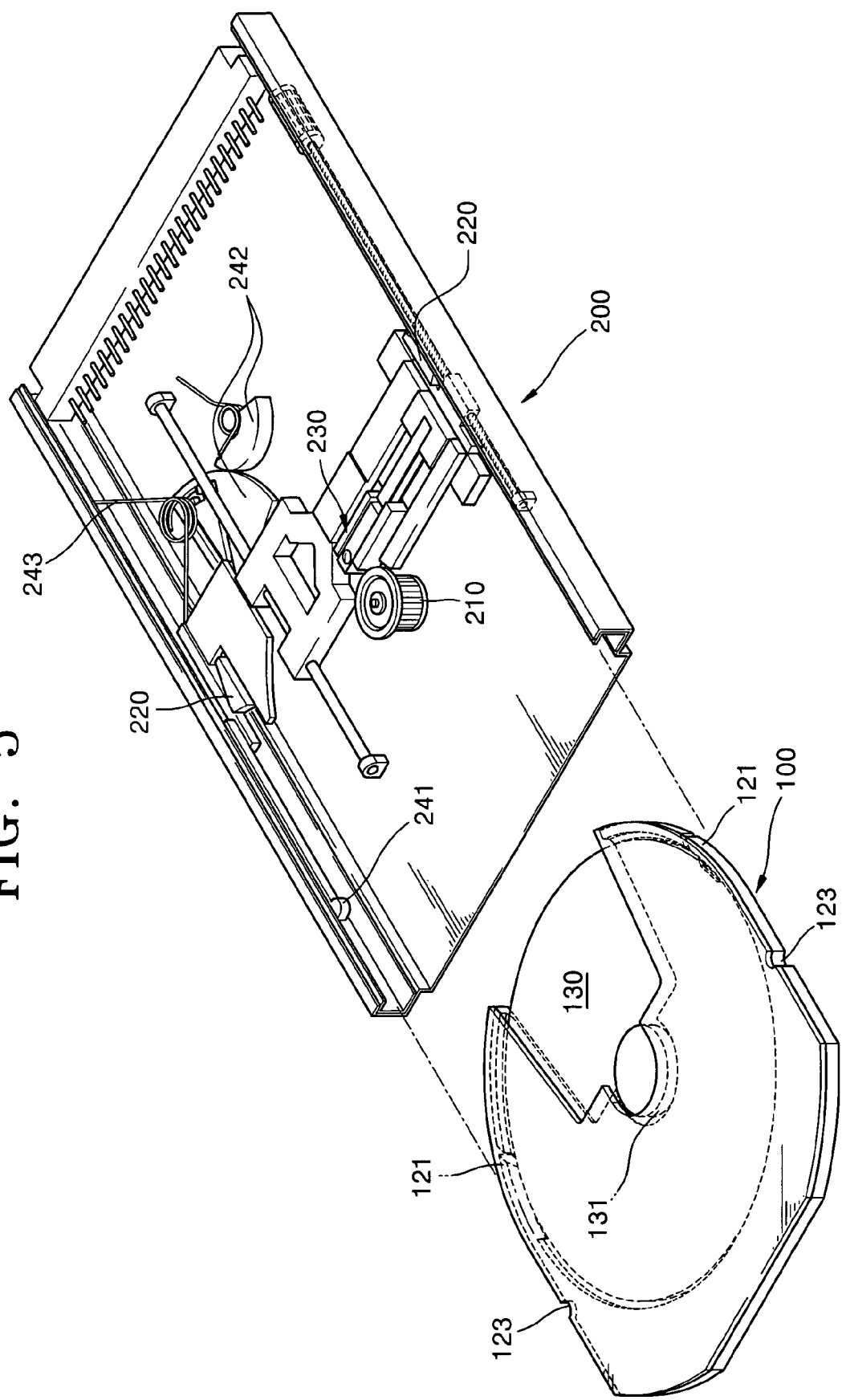
FIGS. 5 through 7 are perspective views illustrating an operation of inserting the disc cartridge shown in FIG. 3 into a disc drive.
Figure 6:
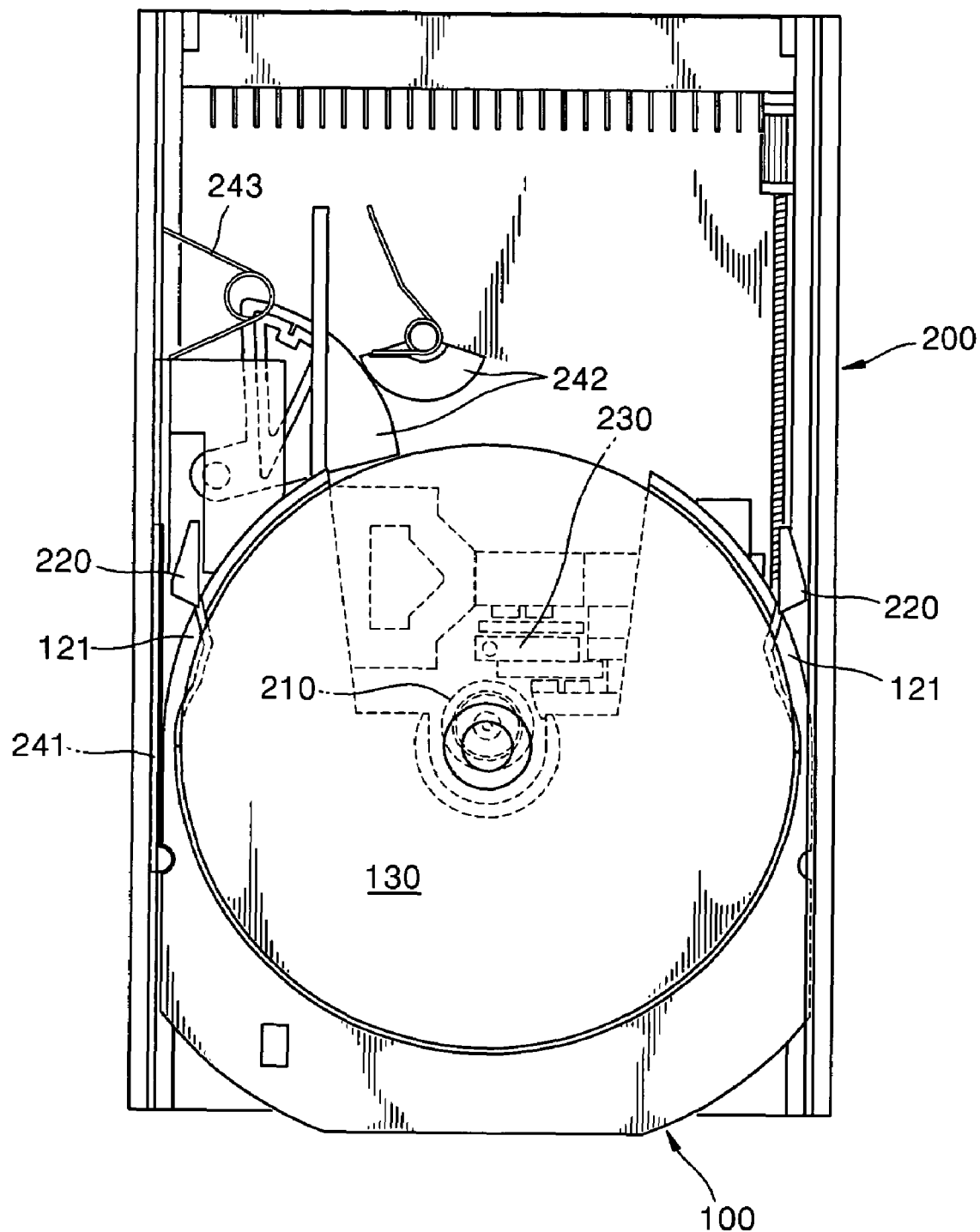
Figure 7:
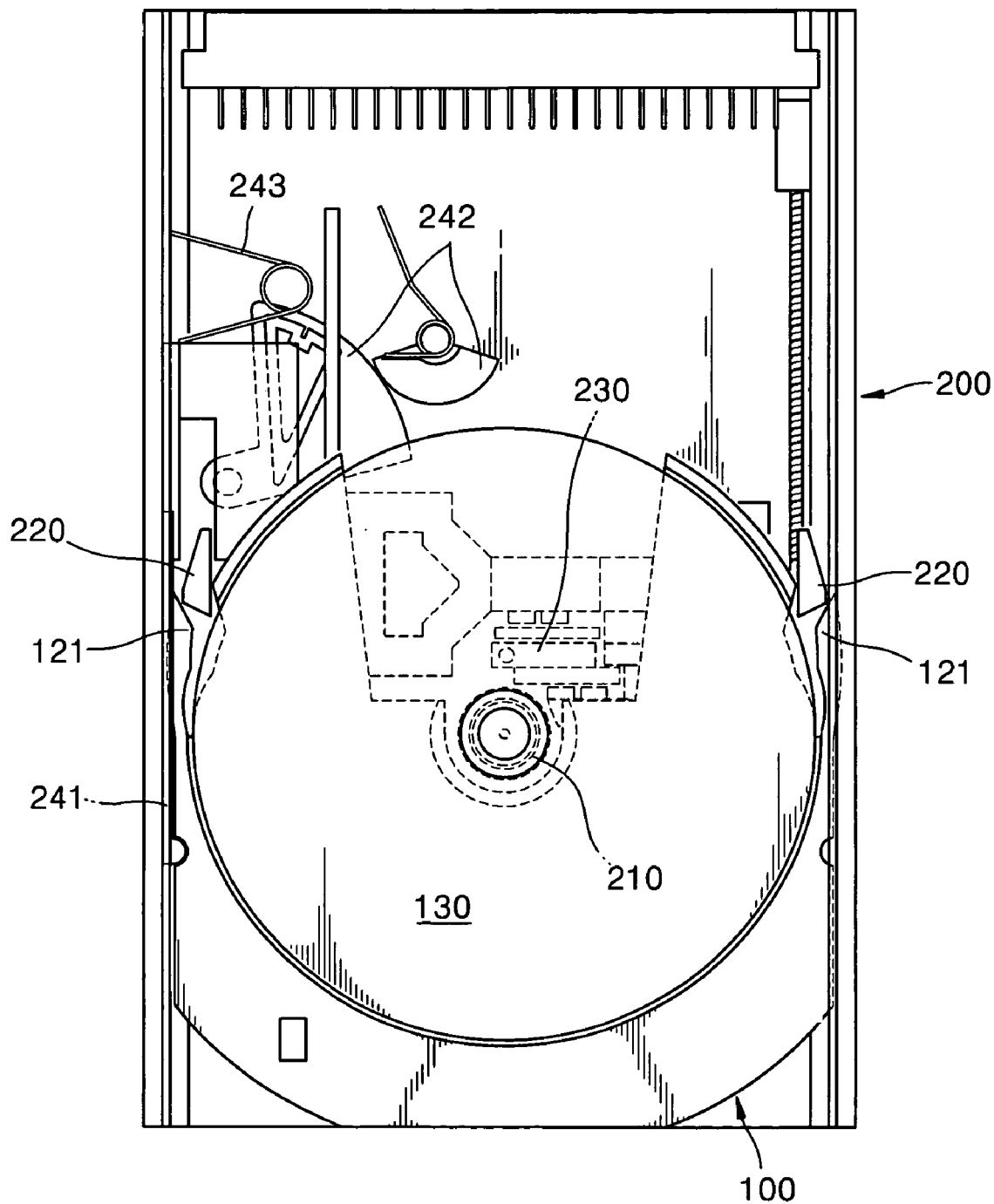

FIG. 3 is an exploded perspective view of a disc cartridge 100 according to the present invention. Referring to FIG. 3, the disc cartridge 100 comprises upper and lower cases 110 and 120 which form a space 122 therebetween to accommodate a disc 130. The lower case 120 comprises a pair of elastic protrusions 121 which are elastically biased toward the space 122 in which the disc 130 is located. A first end of each of the elastic protrusions 121 is fixed to a sidewall of the lower case 120, and a second end of each of the elastic protrusions 121 has a surface 121a sloping toward the space 122. Thus, edges of the disc 130 located in the space 122 are located on the surfaces 121a of the pair of elastic protrusions 121. As a result, the disc 130 is located in an upper portion of the space 122 and is supported by the elastic protrusions 121 when loading the disc 130 as shown in FIG. 4A. However, when the pair of elastic protrusions 121 are opened outwardly, the disc 130 descends on the surfaces 121a and is then located in the space 122 as shown in FIG. 4B. Thus, when an external force is not applied to the disc 130 located in the upper and lower cases 110 and 120, the disc 130 slightly is located in the upper portion of the space 122 and supported by the elastic protrusions 121. However, when the pair of elastic protrusions 121 are opened by the external force, the disc 130 descends on the surfaces 121a and the disc is then located in a lower portion of the space 122. The pair of elastic protrusions 121 prevent the disc 130 from contacting with a motor hub 210 of FIG. 5 when the disc cartridge 100 goes into a disc drive. Thus, the pair elastic protrusions 121 allow the disc 130 to be located in the upper portion of the space when the disc cartridge 100 is in an unloaded state. However, when the disc 130 is completely loaded into a disc drive 200 of FIG. 5, the pair of elastic protrusions 121 are opened to prevent the lower surface of the disc 130 from being scratched by the motor hub 210 in the disc drive 200. Thus, as shown in FIG. 5, levers 220 are installed in the disc drive 200 to open the pair of elastic protrusions 121 when the disc 130 is completely loaded into the disc drive 200. As the disc cartridge 100 enters the disc drive 200, the levers 220 contact with front ends of the pair of elastic protrusions 121 as shown in FIG. 6. Thereafter, when the disc cartridge 100 continues entering the disc drive 200, the levers 220, respectively deform the pair of elastic protrusions 121 to be opened as shown in FIG. 7.

In FIG. 5, openings 101 are formed in the upper and lower cases 110 and 120. In the present embodiment, an optical pickup 230 accesses the disc 130 via the openings 101 without requiring a shutter.

In addition, latches 241 are latched into dents 123 of the disc cartridge 100 when the disc cartridge 100 goes into the disc drive 200 and move inwardly in the disc drive 200 along with the disc cartridge 100. A torsion spring 243 elastically biases the latches 241 in a direction along which the disc cartridge 100 moves out of the disc drive 200. A loading member 242 rotates thereby causing the latches 241 to be locked or unlocked. The latches 241, the torsion spring 243, and the loading member 242 are cartridge loading and unloading units generally used in the disc drive 200. Thus, when the disc cartridge 100 goes into the disc drive 200, the latches 241 move with the disc cartridge 100 and then are locked by the loading member 242 so as to fix the disc cartridge 100 at a loading position. Next, when the disc cartridge 100 is moved to a predetermined position in a loading direction, the latches 241 are unlocked by the loading member 242, and the disc cartridge 100 springs out of the disc drive 200 due to an elastic restoration force of the torsion spring 243.

In the above-described structure, when the disc 130 placed in the disc cartridge 100 is desired to be loaded into the disc drive 200, the disc cartridge 100 goes into the disc drive 200. Here, as shown in FIG. 4A, the disc 130 is supported by the pair of elastic protrusions 121 and thus is located in an upper portion of the space 122. However, when the disc cartridge 100 enters the disc drive 200, as shown in FIG. 6, the front ends of the elastic protrusions 121 contact with the levers 220. Thereafter, the elastic protrusions 121 open outwardly with the entrance of the disc cartridge 100 into the disc drive 200. Accordingly, as the elastic protrusions 121 are opened, the disc 130 descends on the surfaces 121a and is then located in a lower portion of the space 122. As a result, as shown in FIG. 7, the clamp 131 of the disc 130 contacts with the motor hub 210 when the disc cartridge 100 finishes entering the disc drive 200. Thus, recording on and/or reading from the disc 130 are performed when rotating the motor hub 210.

When the disc cartridge 100 is pushed toward the disc drive 200 to unload the disc 130 from the disc drive 200, the disc cartridge 100 springs out of the disc drive 200 by the loading and unloading units. Simultaneously, the elastic protrusions 121 elastically restore to their original positions. The disc 130 then ascends on the surfaces 121a and thus is located in the upper portion of the space 122.

As described above, according to the present invention, a disc is located in the upper portion in a disc cartridge due to support of the elastic protrusions and then descends to be in contact with a motor hub only when the disc cartridge is completely loaded into a disc drive. As a result, the disc can be prevented from being scratched by the motor hub when the disc is loaded into the disc drive.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disc cartridge comprising:
an upper case and a lower case which form an internal space therebetween to accommodate a disc wherein the lower case comprises:
a pair of elastic protrusions that are formed at sidewalls of the lower case and are elastically biased toward the internal space so that ends of the pair of elastic protrusions support the disc,
wherein surfaces are formed at the ends of the pair of elastic protrusions to slope toward the internal space so that the disc is located in an upper portion of the internal space and supported by the pair of elastic protrusions and the disc descends on the surfaces when the pair of elastic protrusions are opened and the disc is then located in a lower portion of the internal space.

2. The disc cartridge of claim 1, wherein the pair of elastic protrusions extend from the sidewalls of the lower case.

3. The disc cartridge of claim 1, further comprising openings formed in the upper and lower cases to allow an optical pickup to access the disc through the openings.

* * * * *

UNITED STATES PATENT AND TRADEMARK OFFICE
CERTIFICATE OF CORRECTION

PATENT NO. : 7,263,705 B2 Page 1 of 1
APPLICATION NO. : 10/765277
DATED : August 28, 2007
INVENTOR(S) : Han-Kook Choi et al.

It is certified that error appears in the above-identified patent and that said Letters Patent is hereby corrected as shown below:

Title Page, Item (57), Abstract, line 4
change "cases" to --case--.

Signed and Sealed this

Twenty-seventh Day of November, 2007

JON W. DUDAS
*Director of the United States Patent and Trademark Office*